US012791421B2

(12) United States Patent
Jiang et al.

(10) Patent No.: US 12,791,421 B2
(45) Date of Patent: Nov. 10, 2026

(54) LIGHT FIXTURE WITH SELF-TEST ABILITY OF SEALING

(71) Applicant: Guangzhou Haoyang Electronic Co., Ltd., Guangzhou (CN)

(72) Inventors: Weikai Jiang, Guangzhou (CN); Jieqiang Jiang, Guangzhou (CN); Wenfeng Chen, Guangzhou (CN); Xindong Liu, Guangzhou (CN)

(73) Assignee: Guangzhou Haoyang Electronic Co., Ltd., Guangzhou (CN)

( * ) Notice: Subject to any disclaimer, the term of this patent is extended or adjusted under 35 U.S.C. 154(b) by 330 days.

(21) Appl. No.: 18/678,814

(22) Filed: May 30, 2024

(65) Prior Publication Data

US 2025/0334473 A1 Oct. 30, 2025

(30) Foreign Application Priority Data

Apr. 29, 2024 (CN) ......................... 202420927642.5

(51) Int. Cl.

| | |
|---|---|
| ***G01M 3/32*** | (2006.01) |
| ***F21V 31/03*** | (2006.01) |
| ***G01M 3/26*** | (2006.01) |
| *F21W 131/105* | (2006.01) |
| *F21W 131/406* | (2006.01) |

(52) U.S. Cl.

CPC ........... *G01M 3/3209* (2013.01); *F21V 31/03* (2013.01); *G01M 3/26* (2013.01); *F21W 2131/105* (2013.01); *F21W 2131/406* (2013.01)

(58) Field of Classification Search

CPC .... G01M 3/26; G01M 3/3272; G01M 3/3209; F21V 31/03

See application file for complete search history.

(56) References Cited

U.S. PATENT DOCUMENTS

| | | | | |
|---|---|---|---|---|
| 10,578,509 | B2 * | 3/2020 | Bialik | G01M 3/02 |
| 2018/0142872 | A1 * | 5/2018 | Owens | F21S 2/005 |
| 2023/0417402 | A1 * | 12/2023 | Jurik | F21V 14/006 |

FOREIGN PATENT DOCUMENTS

| | | | | |
|---|---|---|---|---|
| EP | 2808604 A2 | | 12/2014 | |
| EP | 4299980 A1 | | 1/2024 | |
| JP | 2003178602 A | * | 6/2003 | F21V 23/0442 |

OTHER PUBLICATIONS

Machine translation of JP 2003178602 (Year: 2003).*

* cited by examiner

*Primary Examiner* — Nathaniel J Kolb

(74) *Attorney, Agent, or Firm* — MUNCY, GEISSLER, OLDS & LOWE, P.C.

(57) ABSTRACT

The light fixture with self-test ability of sealing includes a light head in which a light source is provided and a sealed cavity is formed, wherein a light beam generated by the light source is projected out through a light outlet. A built-in pump operable to allow air to enter or exist the sealed cavity and an air pressure sensor for detecting air pressure inside the sealed cavity is further included. A control system is further provided, which is in control connection with the air pressure sensor and the built-in pump and configured to determine sealing performance of the sealed cavity according to the air pressure detected by the air pressure sensor. Self-testing of sealing performance in the present invention is performed without engaging with any external equipment, as well as without disassembling the light fixture form the installation position, which is a time-saving and convenient way.

17 Claims, 11 Drawing Sheets

LIGHT FIXTURE WITH SELF-TEST ABILITY OF SEALING

CROSS REFERENCE TO RELATED APPLICATIONS

The present application claims priority from Chinese Application No. CN 202420927642.5 filed on Apr. 29, 2024, all of which are hereby incorporated herein by reference.

TECHNICAL FIELD

The present invention relates to the technical field of stage light fixtures, and more particularly, relates to a light fixture with self-test ability of sealing.

BACKGROUND

In order to meet requirements for outdoor performances, stage light fixtures are increasingly designed in water resistance. Such stage light fixtures are required to perform a test whether it is adequately sealed before they leave the factory or in after-sales maintenance.

Common methods for sealing test include watering to the stage light fixture or inflating/vacuuming the stage light fixture by auxiliary equipment, such as sealing test equipment, to determine whether it is adequately sealed according to air pressure changes thereof. However, such methods would cause extreme inconvenience for production and after-sales maintenance of the light fixtures, as the light fixtures are required to individually engage with external equipment for sealing test in production, especially before leaving the factory, and sealing test equipment is involved for after-sales maintenance, which thus is extraordinarily time-consuming and labor-consuming.

SUMMARY

It is therefore an object of the present invention to provide a light fixture with self-test ability of sealing, which can achieve self-testing of sealing performance in a time-saving and convenient way without external devices.

The light fixture with self-test ability of sealing according to the present invention includes a light head in which a light source is provided and a sealed cavity is formed, wherein a light beam generated by the light source is projected out through a light outlet. A built-in pump operable to allow air to enter or exist the sealed cavity and an air pressure sensor for detecting air pressure inside the sealed cavity is further included. A control system is further provided, which is in control connection with the air pressure sensor and the built-in pump and configured to determine sealing performance of the sealed cavity according to the air pressure detected by the air pressure sensor.

According to the present invention, the sealed cavity of the light head is inflated or exhausted by a built-in bump to change the air pressure therein, such air pressure change is then detected by the air pressure sensor to determine whether the sealed cavity is adequately sealed. Therefore, self-testing of sealing performance in the present invention is performed without engaging with any external equipment, as well as without disassembling the light fixture form the installation position, which is a time-saving and convenient way.

In order to allow the light source in non-waterproof performance, the light source is preferably arranged in the sealed cavity. In such case, the light fixture can also work normally outdoors even if the light source is non-waterproof.

In a preferably embodiment, a light effect module is provided in the sealed cavity, which is configured to intercept the light beam to change projected light effects of the light fixture. The light effect module makes light effects of the light fixture richer. In addition, the light effect module being arranged in the sealed cavity can avoid the light effect module from contaminating and damage to the associated driving circuits.

In particular, the pump may be configured to allow air to unidirectionally enter or exit the sealed cavity, and the sealed cavity is in air communication with the outside through an additional breathable hole which is operable to be open or closed by an electromagnetic valve in control connection with the control system. In such configuration, one of the pump and the electromagnetic valve is for air in and the other is for air out, the pump thus is only required to unidirectionally let air into or out of the sealed cavity, thereby reducing structural demands for the pump.

In such case, in order to reduce hole numbers in the sealed cavity and thus improve the sealing performance thereof, the side of the breathable hole close to the sealed cavity is connected with branch airways which are respectively connected to the pump and the electromagnetic valve.

Further, to avoid influence on normal work caused by water outside entering the sealed cavity, the passage of the pump and/or the electromagnetic valve in air communication with the outside is provided a waterproof vent valve which allows air to pass and allow water not to pass.

The light fixture may further include a support arm for supporting the light head to rotate and a base for supporting the support arm to rotate. In this case, the light head can achieve rotation in two dimensions so that light beam of the light source can project at any direction.

In this situation, an additional sealed cavity for accommodating a switch mode power supply is formed in the base and the additional sealed cavity of the base is in air communication with the sealed cavity of the light head. In such configuration, the switch mode power supply can be protected by the sealed cavity, and mutual sealing test for the enclosed cavities can achieve with cooperation of the pump and the air pressure sensor.

In particular, considering that the light head is compact in space and redundant space in the base is much more than that in the light head, the pump may be particularly arranged in the base and in air communication with the sealed cavity of the base to make both the enclosed cavities inflated or exhausted. This can allow a space-saving design of the light head.

In this case, the pump may be configured to allow air to unidirectionally enter or exit the sealed cavity of the light head, the sealed cavity of the light head and the sealed cavity of the base are individually in air communication with the outside through a respective breathable hole which is operated to be open or closed by a respective electromagnetic valve in control connection with the control system. The breathable hole makes the sealed cavity in air communication with the outside when in open state, and reversely not in air communication with the outside when in closed state. With configuration of two breathable holes, it can improve air exchange rate between the enclosed cavities and the outside of the light fixture to restore air pressure balance after completion of sealing test, whereby achieving time savings for sealing test.

Further, in order to reduce hole numbers in the sealed cavity and thus improve the sealing performance thereof, the side of the breathable hole close to the sealed cavity of the base is connected with branch airways which are respectively connected to the pump and the electromagnetic valve in the base.

To avoid influence on normal work caused by water outside entering the sealed cavity, the passage of the pump and/or each electromagnetic valve in air communication with the outside is provided a waterproof vent valve which allows air to pass and allow water not to pass.

According to the present invention, in a bid to avoid inaccurate test results due to too low or high ambient temperature, a temperature sensor for detecting the ambient temperature is further provided in each case, which is preferably in control connection with the control system. In such case, it can determine whether it is suitable for conducting sealing test according to the ambient temperature detected by the temperature sensor.

To advantageously achieve sealing performance of the sealed cavity, the air pressure detected by the air pressure includes an initial air pressure inside the sealed cavity before the pump is activated to work by the control system and a current air pressure inside the sealed cavity after the pump works for a predetermined time period, the control system is further configured to determine whether the current air pressure has changed by more than a threshold pressure change value relative to the initial air pressure, in response to the current air pressure having changed by more than the threshold pressure change value and send a signal comprising an indication that the sealed cavity is adequately sealed, in response to the current air pressure not having changed by more than the threshold pressure change value and send a signal comprising an indication that the sealed cavity is not adequately sealed.

As an alternative, the control system is further configured to obtain a change rate of air pressure with a predetermined time period and determine whether the change rate of air pressure has changed by more than a threshold pressure change rate, in response to the change rate of air pressure having changed by more than the threshold pressure change rate and send a signal comprising an indication that the sealed cavity is adequately sealed, in response to the change rate of air pressure not having changed by more than the threshold pressure change rate and send a signal comprising an indication that the sealed cavity is not adequately sealed.

As a further alternative, the air pressure detected by the air pressure sensor includes a current air pressure after the sealed cavity has maintained at a preset air pressure value for a predetermined time period, the control system is further configured to determine whether the current air pressure has changed by more than a threshold pressure change value relative to the preset air pressure value, in response to the current air pressure having changed by more than the threshold pressure change value and send a signal comprising an indication that the sealed cavity is not adequately sealed, in response to the current air pressure not having changed by more than the threshold pressure change value and send a signal comprising an indication that the sealed cavity is adequately sealed.

Additional advantages, features and possible applications of the present invention will be apparent from the description which follows, in which reference is made to the embodiments illustrated in the drawings.

Figure 1:
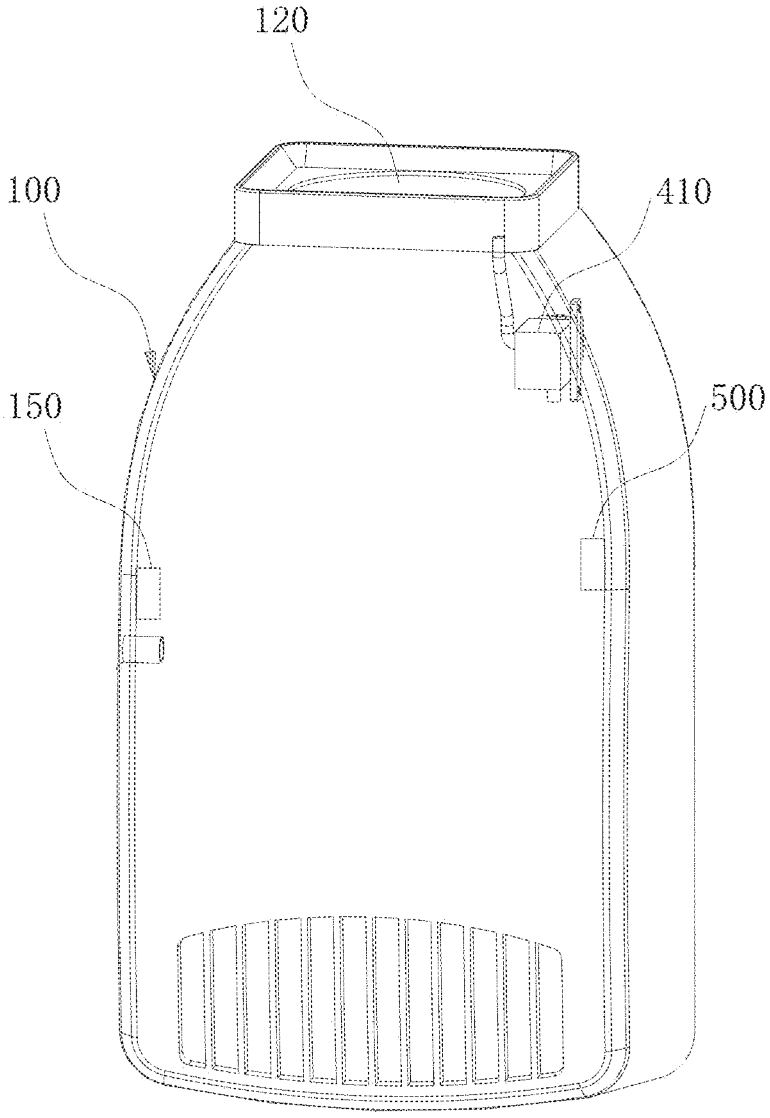
FIG. 1 is a perspective view of a light fixture according to an embodiment of the present invention.

Reference signs: 100 light head, 110 light source, 120 light outlet, 130 sealed cavity in the light head, 140 pump, 150 air pressure sensor, 161 magnifying lens, 162 focusing lens, 163 light shaping assembly, 164 rotary pattern wheel assembly, 200 support arm, 210 airway, 300 base, 310 sealed cavity in the base, 320 switch mode power supply, 400 breathable hole, 410 electromagnetic valve, 420 branch airway, 430 waterproof vent valve, 500 temperature sensor, 600 control system.

DETAILED DESCRIPTION

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

Figure 2:
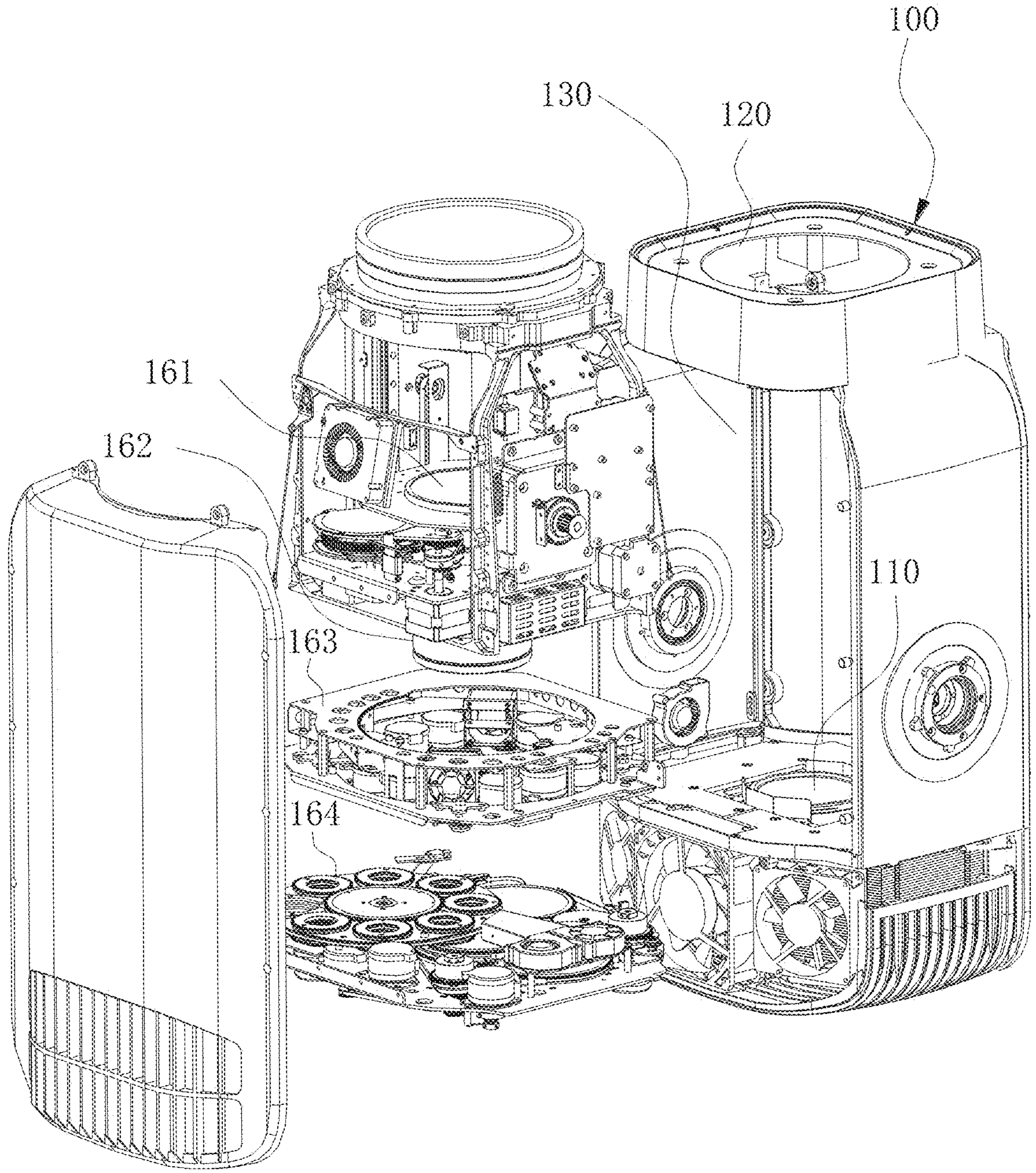
FIG. 2 is an exploded view of a light head of FIG. 1, showing the inside thereof.

FIG. 1 illustrates a light fixture with self-test ability of sealing according to an embodiment of the present invention, which has a light head 100. FIG. 2 depicts an exploded view of the light head 100 of FIG. 1, showing the inside thereof. A light source 110 is provided in the light head 100 and the light beam generated by the light source 110 is projected out through a light outlet 120. A sealed cavity 130 is formed in the light head 100 for accommodating optical elements, especially between the light source 110 and the light outlet 120. A built-in pump 140 for allowing air to enter or exist the sealed cavity 130 and an air pressure sensor 150 for detecting the air pressure inside the sealed cavity 130 are further provided. The light fixture further includes a control system 600 (shown in FIG. 9), which is in control connection with the air pressure sensor 150 and the built-in pump 140 and configured to determine sealing performance of the sealed cavity 130 according to the air pressure detected by the air pressure sensor 150.

According to the present embodiment, the sealed cavity 130 of the light head 100 is inflated or exhausted by a built-in bump 140 to change the air pressure therein, such air pressure change is then detected by the air pressure sensor 150 to determine whether the sealed cavity 130 is adequately sealed. Therefore, self-testing of sealing performance in the present embodiment is performed without engaging with any external equipment, as well as without disassembling the light fixture form the installation position, which is a time-saving and convenient way.

The pump 140 may be arranged in the sealed cavity 130 and also may be arranged outside of the sealed cavity 130. However, the pump 140 is preferably arranged outside of the sealed cavity 130 to avoid influence on normal operation of the light fixture, considering that a plurality of optical elements may be provided in the sealed cavity 130.

According to a preferable embodiment, referring to FIG. 2, the light source 110 is arranged in the sealed cavity 130. In such design, even if the light source 110 is non-waterproof, the light fixture can also work normally outdoors.

In this embodiment, a light effect module is provided in the sealed cavity 130, which is configured to intercept the light beam to change projected light effects of the light fixture. The light effect module makes light effects of the light fixture richer. In addition, the light effect module is arranged in the sealed cavity 130, which can avoid the light effect module from contaminating and damage to the associated driving circuits.

The light effect module specifically can include one or more of a magnifying lens 161 for adjusting divergence angle of the light beam, a focusing lens 162 for adjusting clarity of the light spots, a CMY assembly for adjusting color of the light beam, a light shaping assembly 163 for shaping the light beam, a rotary pattern wheel assembly 164 for generating rotating patterns for the light beam, a fixed pattern wheel assembly generating fixed patterns for the light beam, and a color wheel assembly for coloring the light beam.

Figure 3:
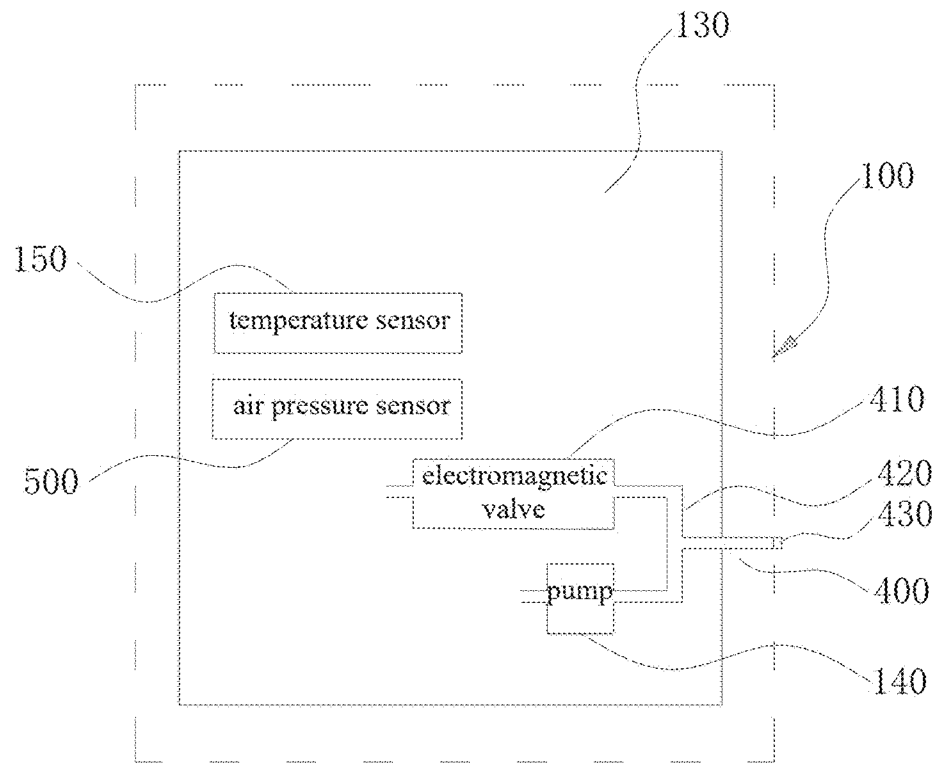
FIG. 3 is a schematic diagram illustrating principle of the sealing test of a sealed cavity of FIG. 2.
Figure 4:
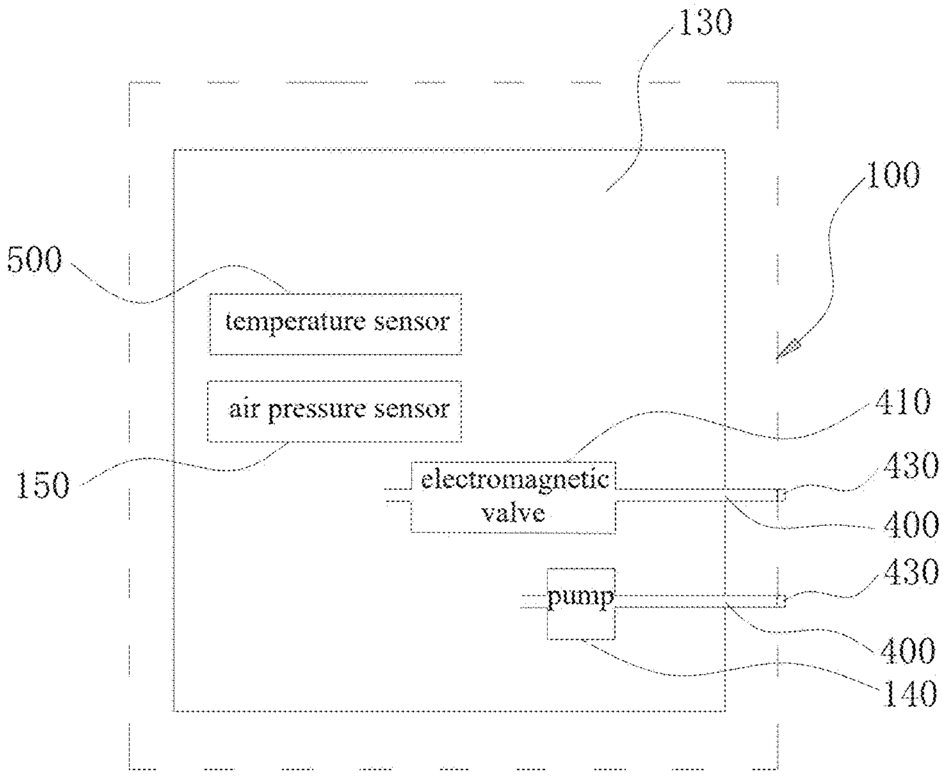
FIG. 4 is another schematic diagram illustrating principle of the sealing test of the sealed cavity of FIG. 2.

FIG. 3 and FIG. 4 are schematic diagrams illustrating principle of the sealing test of the sealed cavity 130 of FIG. 2. According to a preferable embodiment, the pump 140 allows air to unidirectionally enter or exit the sealed cavity 130, and the sealed cavity 130 is in air communication with the outside through an additional breathable hole 400 which is operable to be open or closed by an electromagnetic valve 410 in control connection with the control system 600. In such configuration, one of the pump 140 and the electromagnetic valve 410 is for air in and the other is for air out, the pump 140 thus is only required to unidirectionally let air into or out of the sealed cavity 130, thereby reducing structural demands for the pump 140.

As FIG. 3 shown, in order to reduce hole numbers in the sealed cavity 130 and thus improve the sealing performance thereof, the side of the breathable hole 400 close to the sealed cavity 130 is connected with branch airways 420 which are respectively connected to the pump 140 and the electromagnetic valve 410.

However, as an alternative, in other embodiments, as shown in FIG. 4, the pump 140 and the electromagnetic valve 410 are individually in air communication with the outside through one breathable hole 400.

In particularly, to avoid influence on normal work caused by water outside entering the sealed cavity, the passage of the pump 140 and/or the electromagnetic valve 410 in air communication with the outside is provided a waterproof vent valve 430 which allows air to pass and allow water not to pass.

Figure 5:
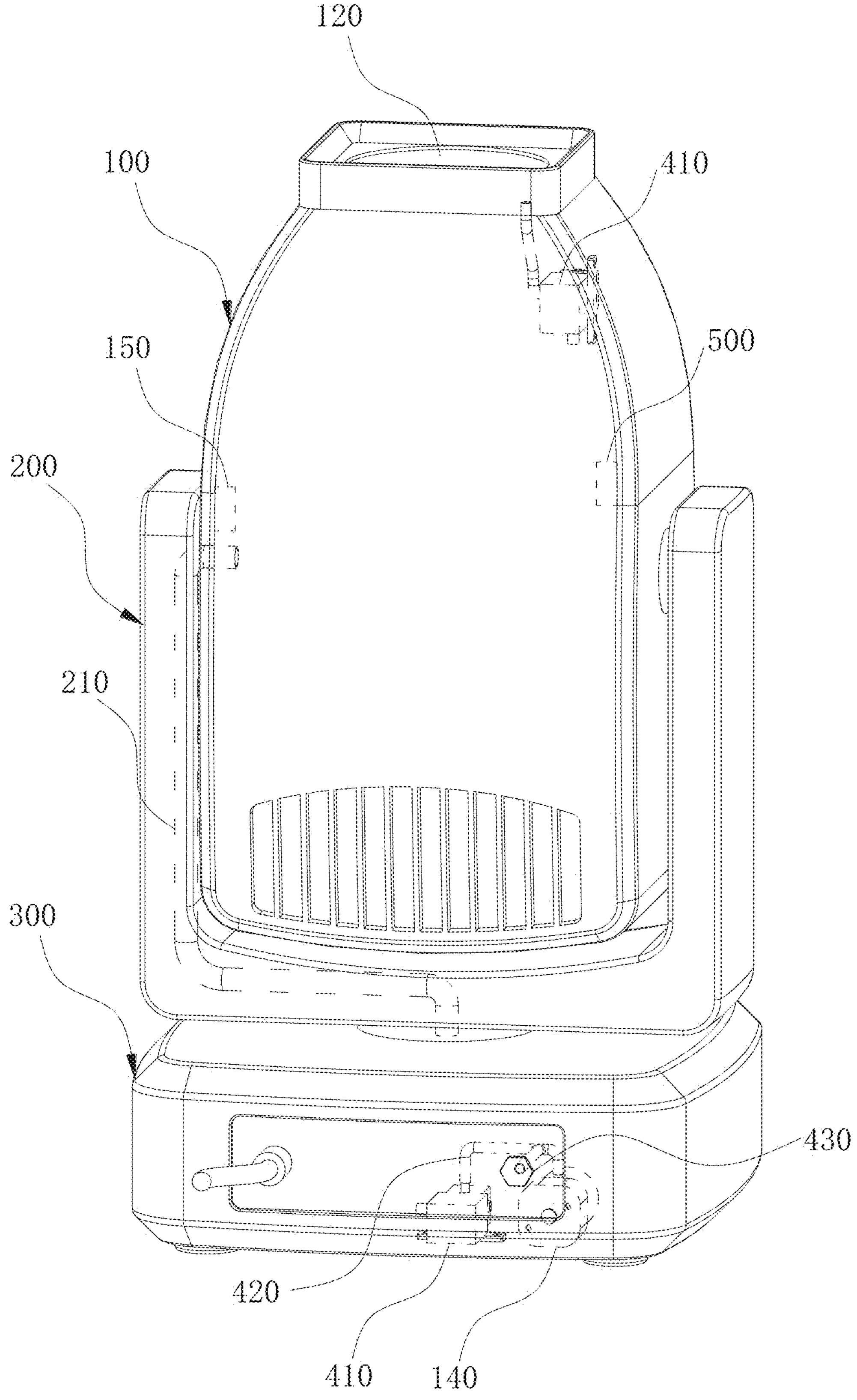
FIG. 5 is a perspective view of a light fixture according to another embodiment of the present invention.

Referring now to FIG. 5, according to a preferable embodiment the light fixture further includes a support arm 200 for supporting the light head 100 to rotate and a base 300 for supporting the support arm 200 to rotate. In this case, the light head 100 can achieve rotation in two dimensions so that light beam of the light source 110 can project at any direction.

In this embodiment, the light head 100 rotates relative to the support arm 200 around a horizontal axis and the support arm 200 rotates relative to the base 300 around a vertical axis. The horizontal axis and the vertical axis are perpendicular to each other.

Figure 6:
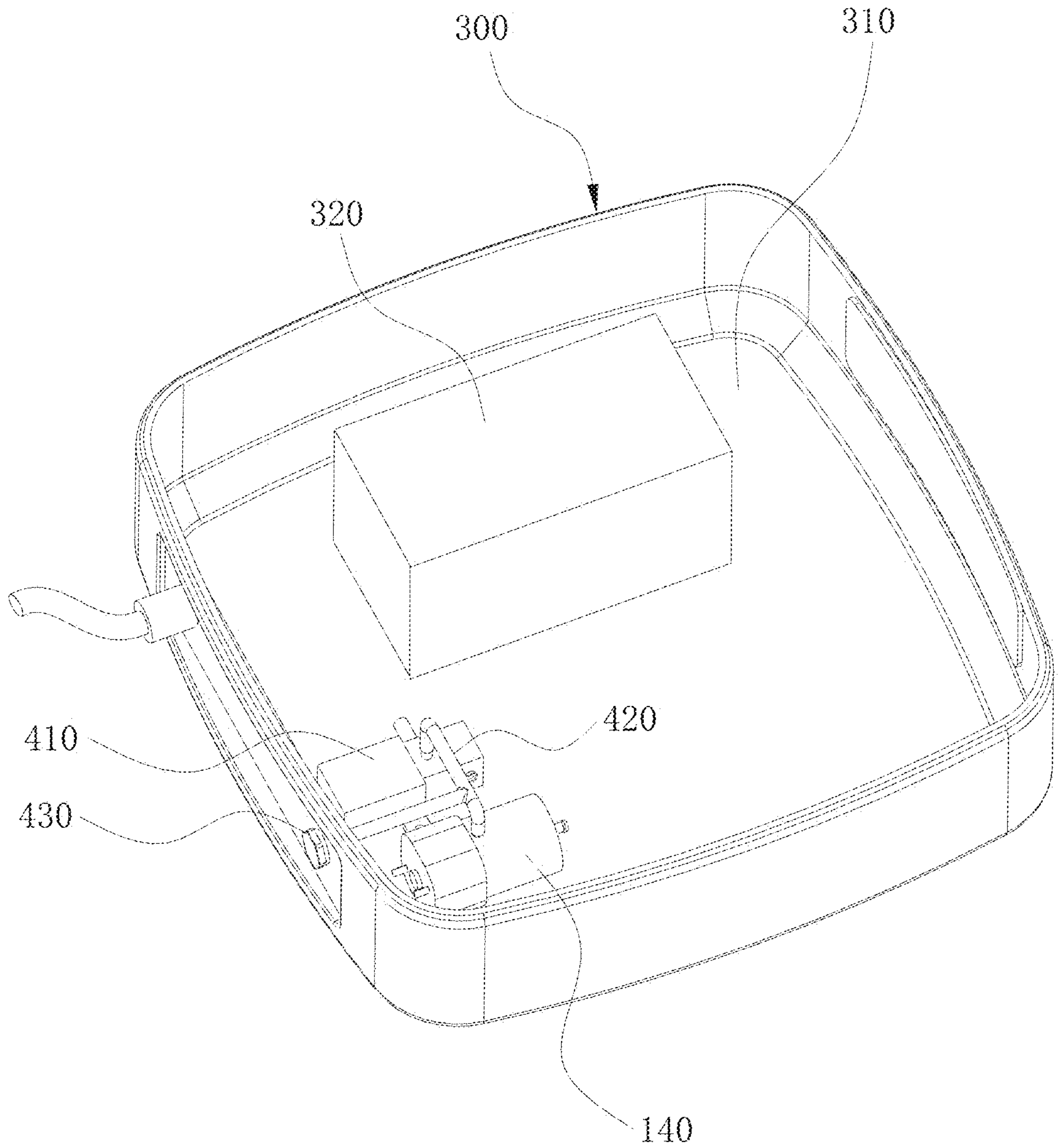
FIG. 6 is a view of a base of FIG. 5, showing the inside thereof.

FIG. 6 depicts inside structures of the base 300 of FIG. 5, an additional sealed cavity 310 for accommodating a switch mode power supply 320 is formed in the base 300 and the sealed cavity 310 is in air communication with the sealed cavity 130. In such configuration, the switch mode power supply 320 can be protected by the sealed cavity 310, and mutual sealing test for the enclosed cavities 130, 310 can achieve with cooperation of the pump 140 and the air pressure sensor 150.

The switch mode power supply 320 is coupled to commercial power grid and powers the whole light fixture after electricity converting.

Particularly, the sealed cavity 310 of the base 300 is in air communication with the sealed cavity 130 of the light head 100 via an airway 210 provided in the support arm 200.

Figure 7:
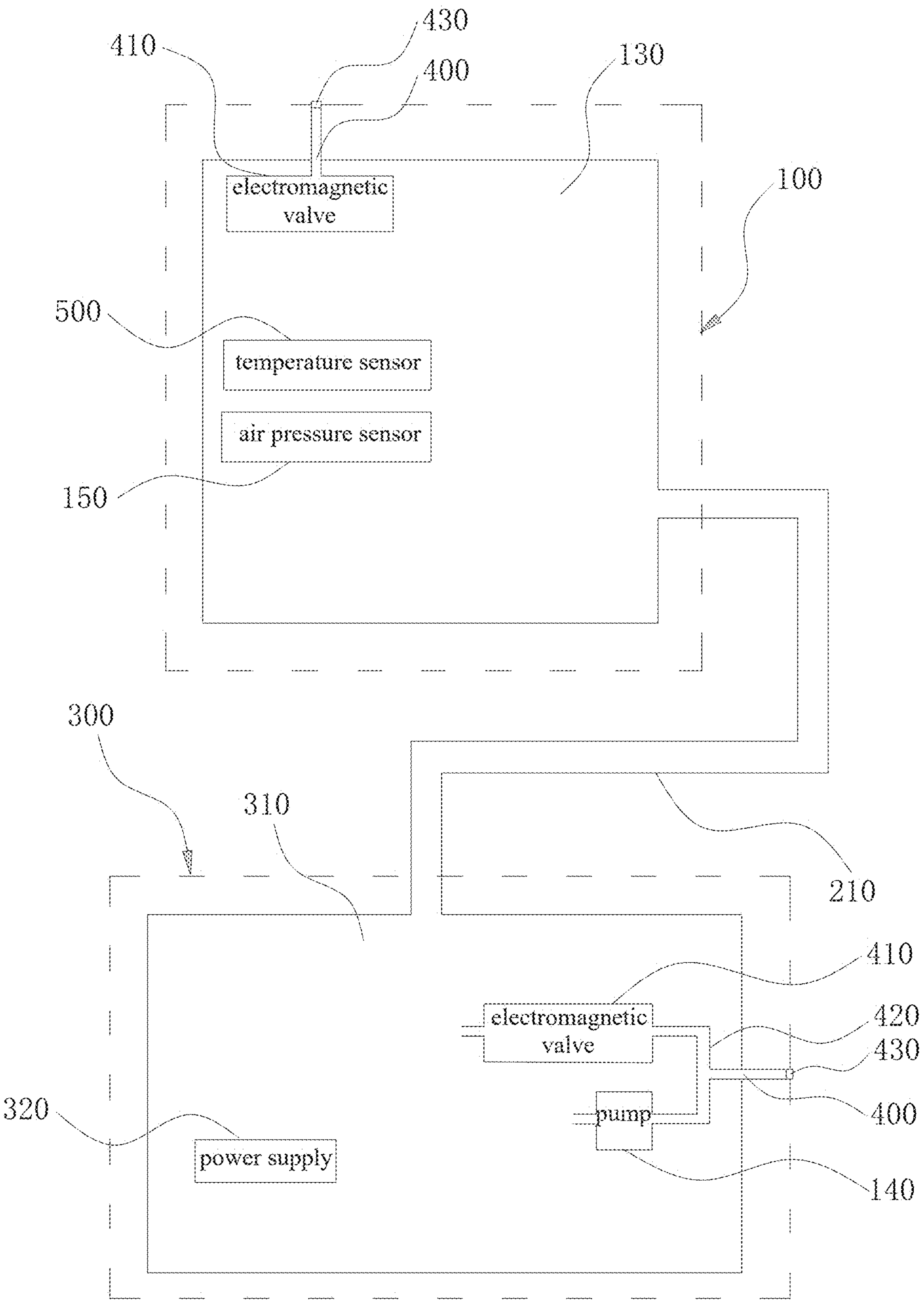
FIG. 7 is a schematic diagram illustrating principle of the sealing test of a sealed cavity of FIG. 5.
Figure 8:
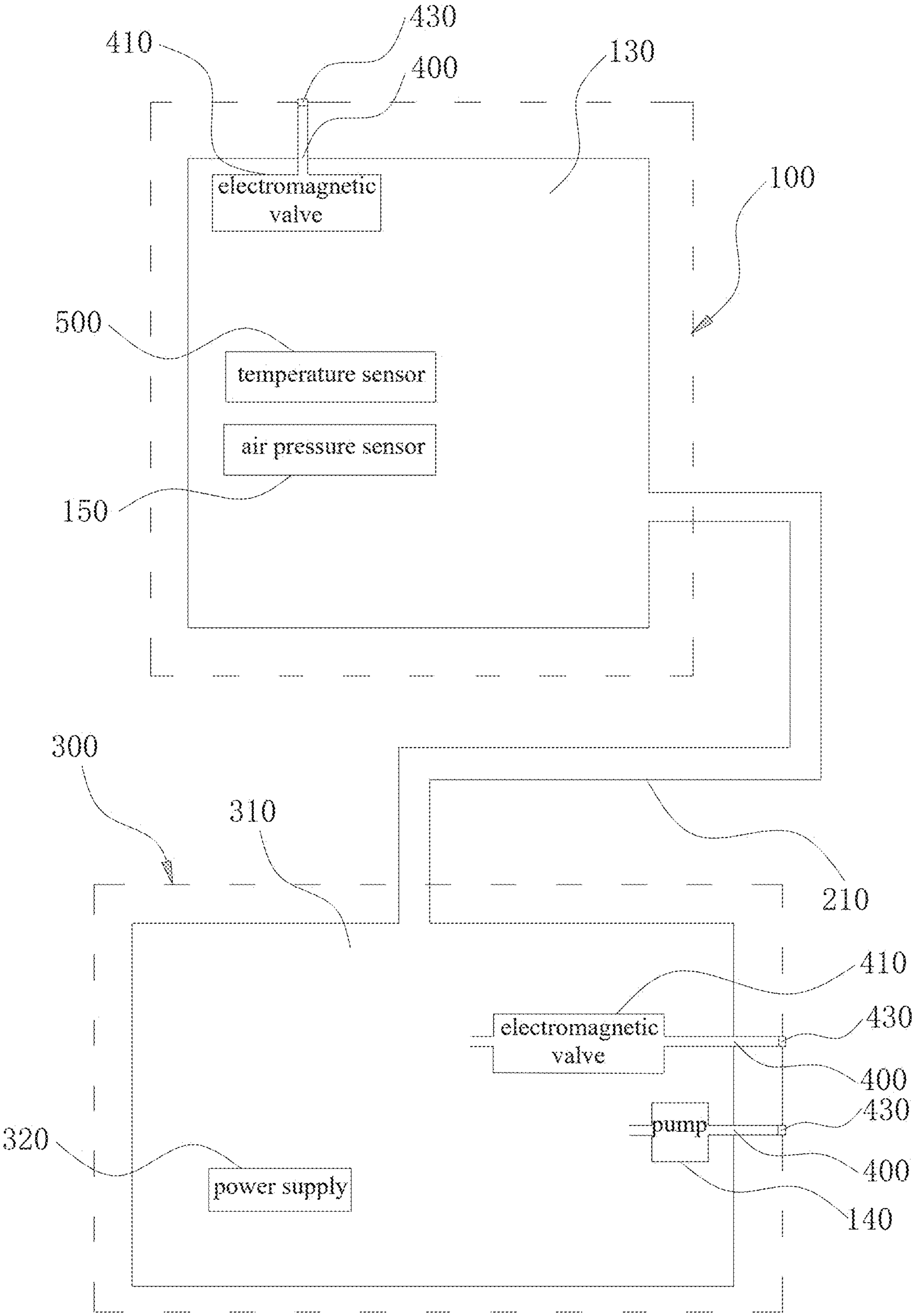
FIG. 8 is another schematic diagram illustrating principle of the sealing test of the sealed cavity of FIG. 5.

FIG. 7 and FIG. 8 are schematic diagrams illustrating principle of the sealing test of the sealed cavity 130 of FIG. 5. According to a preferably embodiment, considering that the light head 100 is compact in space and redundant space in the base 300 is much more than that in the light head 100, the pump 140 is particularly arranged in the base 300 and in air communication with the sealed cavity 310 of the base 300 to make both the enclosed cavities 130, 310 inflated or exhausted. This allows a space-saving design of the light head 100. The pump 140 allows air to unidirectionally enter or exit the sealed cavity 130 of the light head 100, in this embodiment the sealed cavity 130 of the light head 100 and the sealed cavity 310 of the base 300 are individually in air communication with the outside through a respective breathable hole 400 which is operated to be open or closed by a respective electromagnetic valve 410 in control connection with the control system 600. The breathable hole 400 makes the sealed cavity in air communication with the outside when in open state, and reversely not in air communication with the outside when in closed state. With two breathable holes 400, it can improve air exchange rate between the enclosed cavities 130, 310 and the outside of the light fixture to restore air pressure balance after completion of sealing test, whereby achieving time savings for sealing test.

The electromagnetic valve 410 is preferably set as normally open.

As FIG. 7 shown, in order to reduce hole numbers in the sealed cavity 130 and thus improve the sealing performance thereof, the side of the breathable hole 400 close to the sealed cavity 310 of the base 300 is connected with branch pipes 420 which are respectively connected to the pump 140 and the electromagnetic valve 410 in the base 300.

In other embodiments, the pump 140 can allow air to enter and exit the sealed cavity 130 of the light head 100, or the pump 140 maintains open to make the sealed cavity 130 in air communication with the outside, in such situation no additional breathable hole 400 is required.

As shown in FIG. 8, in an alternative embodiment, the pump 140 and the electromagnetic valve 410 are individually in air communication with the outside through one breathable hole 400.

To avoid influence on normal work caused by water outside entering the sealed cavity, the passage of the pump 140 and/or the electromagnetic valve 410 in air communication with the outside is provided a waterproof vent valve 430 which allows air to pass and allow water not to pass.

In this embodiment, the pump 140 and/or each electromagnetic valve 410 is connected to the side of the breathable hole 400 facing to the sealed cavity and the waterproof vent valve 430 is connected to the side of the breathable hole 400 facing the outside.

Figure 9:
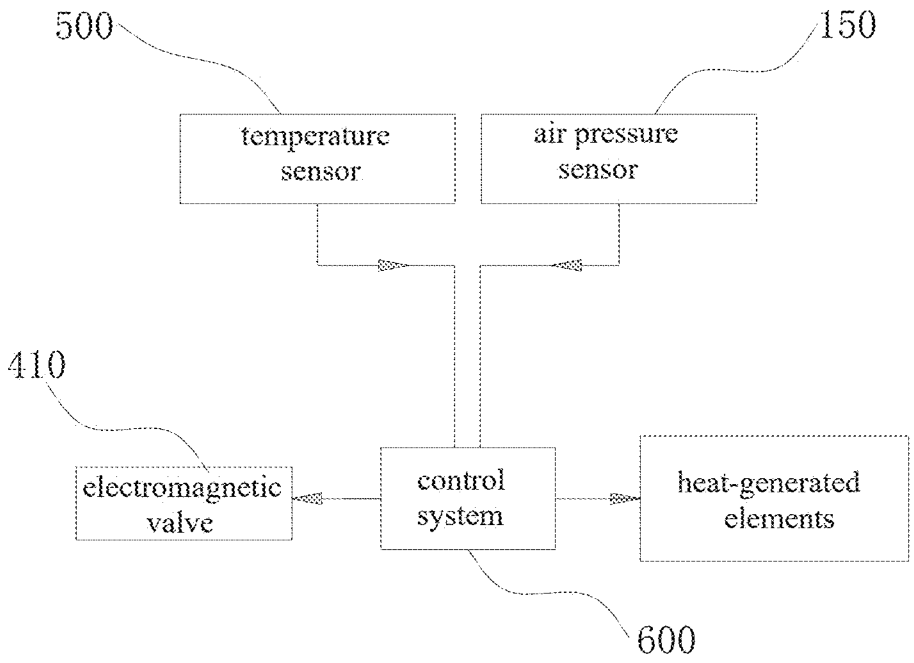
FIG. 9 is a diagram showing a signal control flow according to an embodiment of the present invention.

According to a preferable embodiment, a temperature sensor 500 for detecting the ambient temperature is further provided, which is preferably in control connection with the control system 600 (shown in FIG. 9). It can determine whether it is suitable for conducting sealing test according to the ambient temperature detected by the temperature sensor 500, so as to avoid inaccurate test results due to too low or high ambient temperature.

The suitable ambient temperature for sealing test preferably ranges from 0° C. to 70° C.

The temperature sensor 500 can be arranged in the sealed cavity 130 of the light head 100 and can also be arranged in the sealed cavity 310 of the base 300. However, the temperature sensor 500 is preferably arranged in the sealed cavity 130 of the light head 100.

It should be noted that the pump 140, the temperature sensor 500, the branch pipes 420, the electromagnetic valve 410, the air pressure sensor 150 and the airway 210 in FIG. 1 are illustrated in dashed lines.

The light fixture mentioned above can achieve lots of sealing self-test methods, including but not limited to the following methods.

Figure 10:
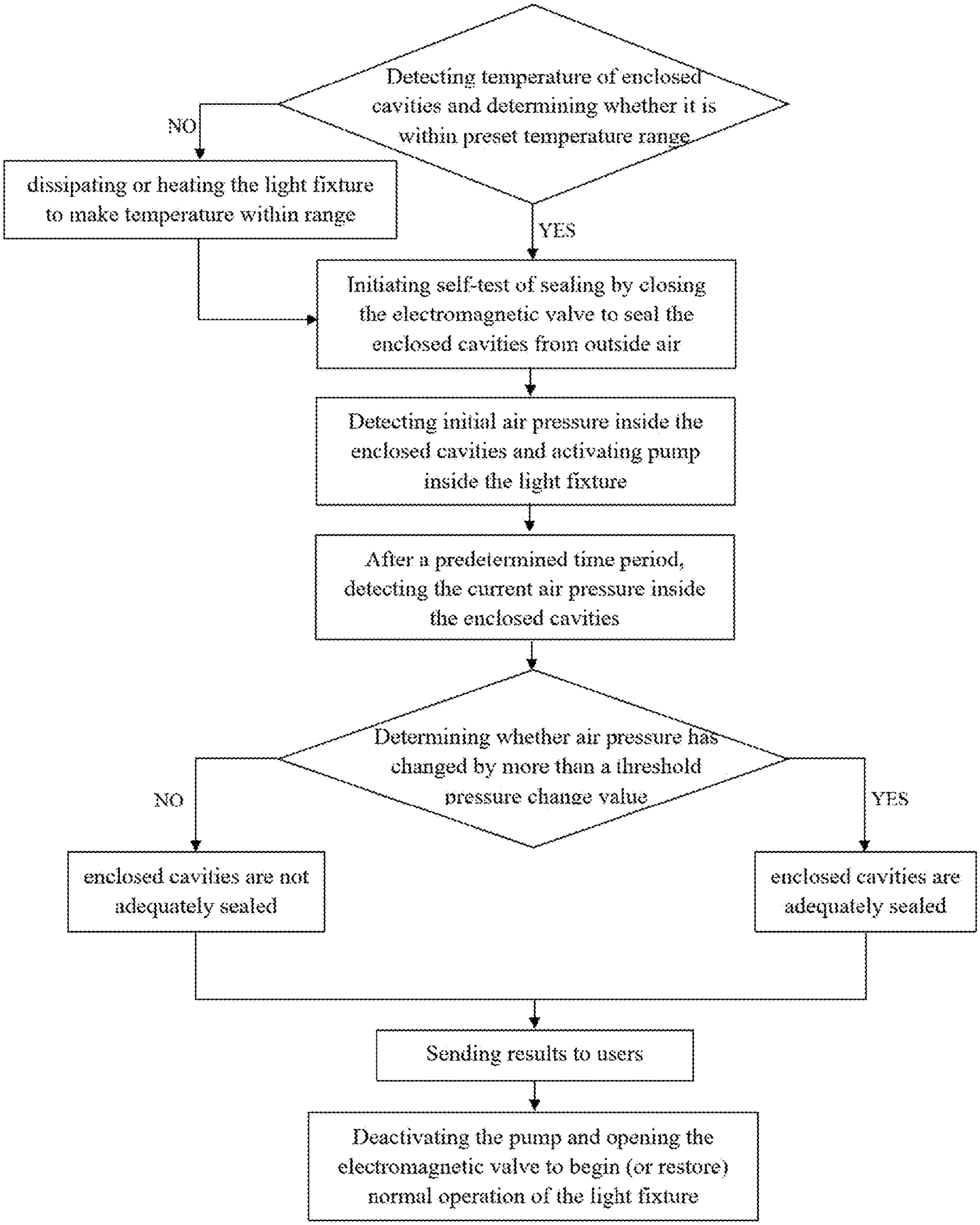
FIG. 10 is a flow diagram showing a method for performing a self-test of sealing for sealed cavity of a light fixture according to an embodiment of the present invention.

FIG. 10 illustrates a first method for performing a self-test of sealing for enclosed cavities 130, 310 of the light fixture including the following steps.

The electromagnetic valve 410 is closed by a control system of the light fixture to initiate the self-test of sealing, wherein the enclosed cavities 130, 310 are sealed from the outside. Initial air pressure inside the enclosed cavities 130, 310 is detected by the air pressure sensor 150. The pump 140 inside the light fixture is then activated by the control system to inflate or exhaust the enclosed cavities 130, 310. After a predetermined time period, the current air pressure is detected by the air pressure sensor 150. It is determined, by the control system, whether the current air pressure has increased or decreased by more than a threshold pressure change value relative to the initial air pressure. If yes, the enclosed cavities 130, 310 are adequately sealed, and a signal indicating that the sealed cavity is adequately sealed is sent to the user; otherwise, the enclosed cavities 130, 310 are not adequately sealed and a signal indicating that the sealed cavity is not adequately sealed is sent to the user. The determination results can be directly displayed on the control panel of the light fixture or remotely sent to the user through IoT (Internet of Things). Finally, the pump 140 is deactivated and the electromagnetic valve 410 is opened to begin (or restore) normal operation of the light fixture by the control system.

Figure 11:
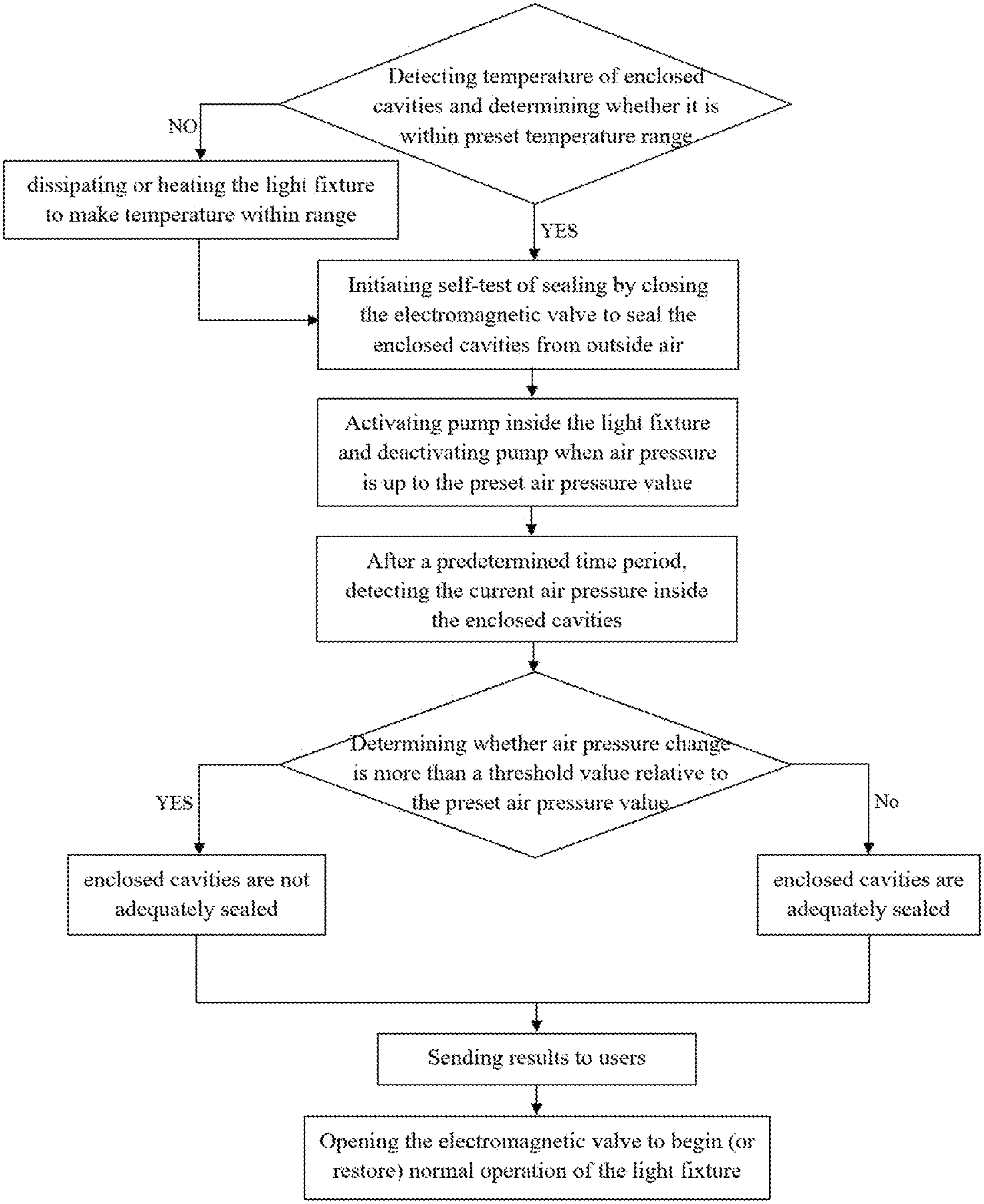
FIG. 11 is a flow diagram showing a method for performing a self-test of sealing for sealed cavity of a light fixture according to another embodiment of the present invention.

FIG. 11 illustrates a second method for performing a self-test of sealing for enclosed cavities 130, 310 of the light fixture including the following steps.

The electromagnetic valve 410 is closed by a control system of the light fixture to initiate the self-test of sealing, wherein the enclosed cavities 130, 310 are sealed from the outside. The pump 140 is activated by the control system to inflate or exhaust the enclosed cavities 130, 310. The pump 140 is then deactivated when the air pressure is up to the preset air pressure value. After waiting a predetermined time period, the current air pressure inside the enclosed cavities 130, 310 is detected by the air pressure sensor 150. It is determined, by the control system, whether the current air pressure has increased or decreased by more than a threshold pressure change value relative to the preset air pressure value. If yes, the enclosed cavities 130, 310 are not adequately sealed, and a signal indicating that the sealed cavity is not adequately sealed is sent to the user; otherwise, the enclosed cavities 130, 310 are adequately sealed and a signal indicating that the sealed cavity is adequately sealed is sent to the user. The determination results can be directly displayed on the control panel of the light fixture or remotely sent to the user through IoT (Internet of Things). Finally, the electromagnetic valve 410 is opened to begin (or restore) normal operation of the light fixture by the control system.

Figure 12:
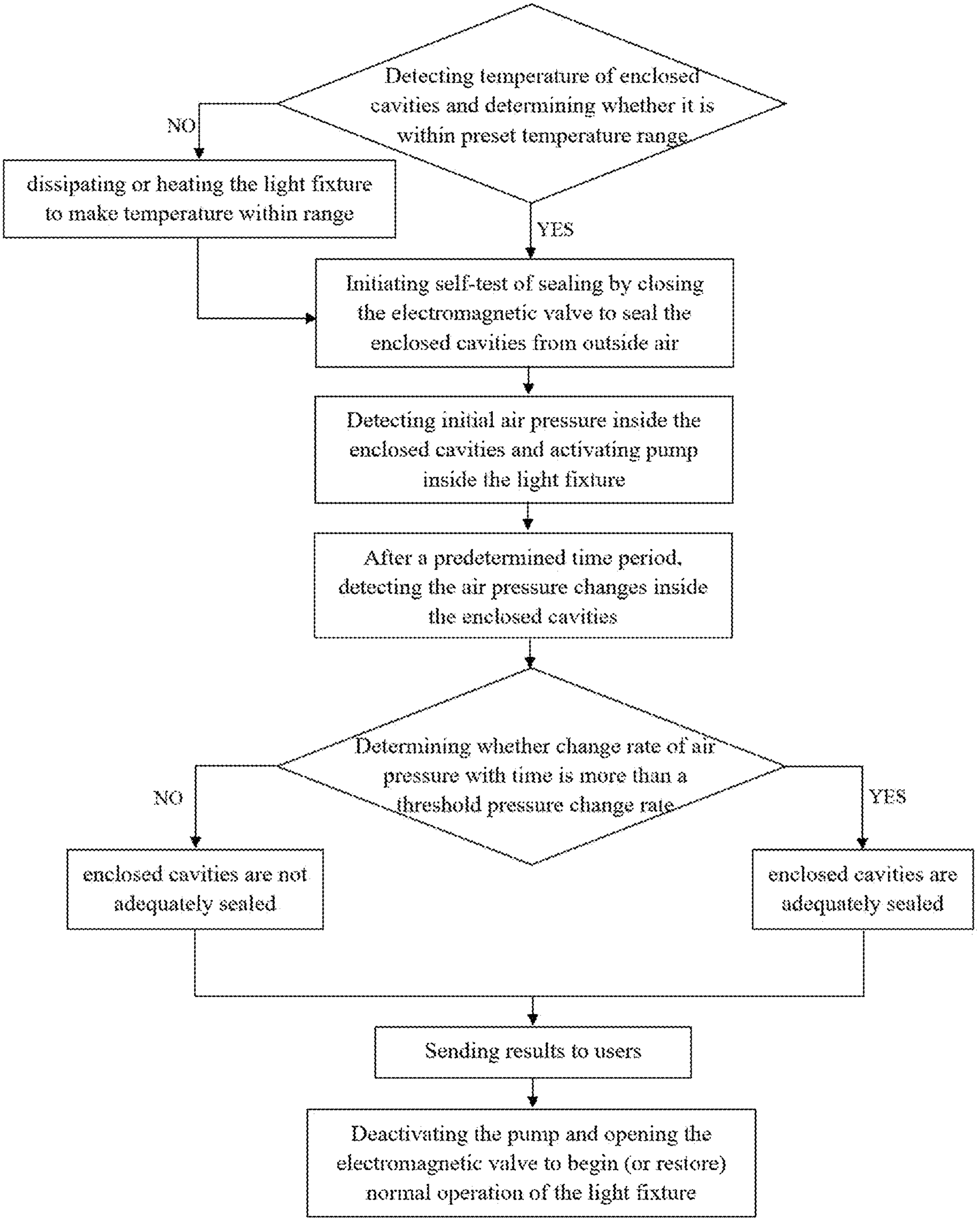
FIG. 12 is a flow diagram showing a method for performing a self-test of sealing for sealed cavity of a light fixture according to another embodiment of the present invention.

FIG. 12 illustrates a third method for performing a self-test of sealing for enclosed cavities 130, 310 of the light fixture including the following steps.

The electromagnetic valve 410 is closed by a control system of the light fixture to initiate the self-test of sealing, wherein the enclosed cavities 130, 310 are sealed from the outside. Initial air pressure is detected by the air pressure sensor 150. The pump 140 is then activated by the control system to inflate or exhaust the enclosed cavities 130, 310. Within a predetermined time period, the air pressure changes inside the enclosed cavities 130, 310 with time is detected by the air pressure sensor 150 and the change rate of air pressure with time is obtained by the control system. It is determined, by the control system, whether the change rate of air pressure with time is more than a threshold pressure change rate. If yes, the enclosed cavities 130, 310 are adequately sealed, and a signal indicating that the sealed cavity 130, 310 is adequately sealed is sent to the user; otherwise, the sealed cavity 130, 310 is not adequately sealed and a signal indicating that the enclosed cavities are not adequately sealed is sent to the user. The determination results can be directly displayed on the control panel of the light fixture or remotely sent to the user through IoT (Internet of Things). Finally, the pump 140 is deactivated and the electromagnetic valve 410 is opened to begin (or restore) normal operation of the light fixture by the control system.

According to a preferable embodiment, prior to initiating the test, the temperature inside the enclosed cavities 130, 310 is detected by the temperature sensor 500 and determined by the control system whether the temperature detected is within the preset temperature range. If yes, the test is initiated by closing the electromagnetic valve 410; If not, the control system sends a signal to the user to dissipate the light fixture when temperature is beyond the preset temperature range or heat the light fixture when temperature is less than the preset temperature range, especially activating the light source or other heat-generated optical elements inside the enclosed cavities 130, 310.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A light fixture having a self-testing ability, comprising:

a light head in which a light source is provided and a sealed cavity is formed, wherein a light beam generated by the light source is projected out through a light outlet;

a built-in pump, which is operable to allow air to enter or exit the sealed cavity;

an air pressure sensor for detecting air pressure inside the sealed cavity;

a control system, operably connected with the air pressure sensor and the built-in pump and configured to determine sealing performance of the sealed cavity according to the air pressure detected by the air pressure sensor;

a support arm for supporting the light head to rotate and a base for supporting the support arm to rotate;

an additional sealed cavity for accommodating a switch mode power supply formed in the base and the additional sealed cavity being in air communication with the sealed cavity; wherein the pump is arranged in the base and in air communication with the additional sealed cavity to change the air pressure in both the additional sealed cavity and the sealed cavity.

2. The light fixture according to claim 1, wherein the light source is arranged in the sealed cavity.

3. The light fixture according to claim 1, wherein a light effect module is provided in the sealed cavity, which is configured to intercept the light beam to change projected light effects of the light fixture.

4. The light fixture according to claim 1, wherein the pump is configured to allow air to unidirectionally enter or exit the additional sealed cavity, and the additional sealed cavity is in air communication with the ambient environment through a vent hole.

5. The light fixture according to claim 4, wherein a side of the vent hole close to the additional sealed cavity is connected with branch airways which are respectively connected to the pump and an electromagnetic valve operably connected with the control system.

6. The light fixture according to claim 4, wherein a first passage is in air communication with the pump and the ambient environment, and a second passage, having an electromagnetic valve, is in air communication with the additional sealed cavity and the ambient environment, wherein an outlet of at least one of the first passage and the second passage allows air to pass and prevents water from passing.

7. The light fixture according to claim 1, wherein the pump is configured to allow air to unidirectionally enter or exit the additional sealed cavity, wherein the sealed cavity and the additional sealed cavity are individually in air communication with the ambient environment through respective passages connected to respective vent holes; wherein each respective passage is operable to be open or closed by a respective electromagnetic valve operably connected with the control system.

8. The light fixture according to claim 7, wherein the vent hole connected to the additional sealed cavity is connected with branch air ways which are respectively connected to the pump and the electromagnetic valve in the base.

9. The light fixture according to claim 7, wherein an outlet of at least one of the respective passages in air communication with the ambient environment allows air to pass and prevents water from passing.

10. The light fixture with self test ability of sealing according to claim 1, further comprising a temperature sensor operably connected with the control system for detecting a temperature within the sealed cavity.

11. The light fixture according to claim 1, wherein the air pressure detected by the air pressure sensor includes an initial air pressure inside the sealed cavity before the pump is activated by the control system and a subsequent air pressure inside the sealed cavity after the pump operates for a predetermined time period, wherein the control system is further configured to determine whether the subsequent air pressure has changed by more than a threshold pressure change value relative to the initial air pressure, wherein, in response to the subsequent air pressure having changed by more than the threshold pressure change value the control system sends a signal comprising an indication that the sealed cavity and the additional sealed cavity are adequately sealed, and in response to the subsequent air pressure not having changed by more than the threshold pressure change value the control system sends a signal comprising an indication that the sealed cavity or the additional sealed cavity is not adequately sealed.

12. The light fixture according to claim 1, wherein the air pressure detected by the air pressure sensor includes an initial air pressure inside the sealed cavity before the pump is activated by the control system and a subsequent air pressure inside the sealed cavity after the pump operates for a predetermined time period, wherein the control system is further configured to obtain a change rate of air pressure during the predetermined time period and determine whether the change rate of air pressure is more than a threshold change rate of air pressure, wherein in response to the change rate of air pressure being more than the threshold change rate of air pressure the control system sends a signal comprising an indication that the sealed cavity and the additional sealed cavity are adequately sealed, and in response to the change rate of air pressure not being more than the threshold change rate of air pressure the control system sends a signal comprising an indication that the sealed cavity or the additional sealed cavity is not adequately sealed.

13. The light fixture according to claim 1, wherein the air pressure detected by the air pressure sensor includes a current air pressure after the sealed cavity has changed to a preset air pressure value under action of the pump and then a predetermined time period has elapsed with the pump deactivated, wherein the control system is further configured to determine whether the current air pressure has changed by more than a threshold pressure change value relative to the preset air pressure value, wherein in response to the current air pressure having changed by more than the threshold pressure change value the control system sends a signal comprising an indication that the sealed cavity or the additional sealed cavity is not adequately sealed, and in response to the current air pressure not having changed by more than the threshold pressure change value, the control system sends a signal comprising an indication that the sealed cavity and the additional sealed cavity are adequately sealed.

14. A method for performing a self-test of a sealed cavity and an additional sealed cavity in air communication with the sealed cavity of a light fixture, comprising:

initiating, by a control system of the light fixture, the self-test by closing a vent hole to seal the sealed cavity and the additional sealed cavity from the ambient environment;

detecting, by an air pressure sensor of the light fixture, an initial air pressure inside of the sealed cavity;

activating, by the control system, a built-in pump inside the light fixture;

waiting, by the control system, for a predetermined time period, and detecting, by the air pressure sensor, a subsequent air pressure inside the sealed cavity;

determining, by the control system, whether the subsequent air pressure has changed by more than a threshold pressure change value relative to the initial air pressure, or whether a change rate of air pressure with time is more than a threshold change rate of air pressure;

sending, by the control system, a signal comprising an indication whether the sealed cavity and the additional sealed cavity are adequately sealed;

deactivating the pump by the control system; and opening the vent hole by the control system wherein the light fixture comprises:

a light head in which a light source is provided;

a support arm for supporting the light head to rotate and a base for supporting the support arm to rotate; and the additional sealed cavity for accommodating a switch mode power supply formed in the base;

wherein the pump is arranged in the base and in air communication with the additional sealed cavity to change the air pressure in both the additional sealed cavity and the sealed cavity.

15. The method according to claim 14, further comprising prior to initiating the self-test, detecting temperature inside the sealed cavity by a temperature sensor and determining by the control system whether the temperature detected is within a preset temperature range, if yes, initiating the self-test; if not, allowing heat to dissipate from the light fixture to cool the light fixture or activating a heat-generating element inside the sealed cavity by the control system to heat the light fixture until the temperature is within the preset temperature range.

16. A method for performing a self-test of a sealed cavity and an additional sealed cavity in air communication with the sealed cavity of a light fixture, comprising:

initiating, by a control system of the light fixture, the self-test by closing a vent hole to seal the sealed cavity and the additional sealed cavity from the ambient environment;

activating, by the control system, a built-in pump inside the light fixture until air pressure inside of the sealed cavity is up to a preset air pressure value;

deactivating, by the control system, the built-in pump;

waiting, by the control system, for a predetermined time period, and detecting, by the air pressure sensor, a current air pressure inside the sealed cavity;

determining, by the control system, whether the current air pressure has changed by more than a threshold pressure change value relative to the preset air pressure value;

sending, by the control system, a signal comprising an indication whether the sealed cavity and the additional sealed cavity are adequately sealed; and opening the vent hole by the control system wherein the light fixture comprises:

a light head in which a light source is provided;

a support arm for supporting the light head to rotate and a base for supporting the support arm to rotate; and the additional sealed cavity for accommodating a switch mode power supply formed in the base;

wherein the pump is arranged in the base and in air communication with the additional sealed cavity to change the air pressure in both the additional sealed cavity and the sealed cavity.

17. The method according to claim 16, further comprising prior to initiating the self-test, detecting temperature inside the sealed cavity by a temperature sensor and determining by the control system whether the temperature detected is within a preset temperature range, if yes, initiating the self-test; if not, allowing heat to dissipate from the light fixture to cool the light fixture or activating a heat-generating element inside the sealed cavity by the control system to heat the light fixture until the temperature is within the preset temperature range.

* * * * *